United States Patent [19]
Kong et al.

[11] Patent Number: 5,639,722
[45] Date of Patent: Jun. 17, 1997

[54] ACIDIC AQUEOUS CLEANING COMPOSITIONS

[75] Inventors: Stephen B. Kong, Alameda; Robert L. Blum, Concord, both of Calif.

[73] Assignee: The Clorox Company, Oakland, Calif.

[21] Appl. No.: 379,010

[22] Filed: Jan. 27, 1995

Related U.S. Application Data

[63] Continuation of Ser. No. 4,091, Jan. 13, 1993, abandoned.

[51] Int. Cl.$^6$ ............................. C11D 3/02; C11D 3/39; B08B 3/00
[52] U.S. Cl. ...................... 510/191; 510/199; 510/363; 510/488; 134/42
[58] Field of Search .......................... 252/142, 80, 82, 252/174.19, 174.11, 553, 556; 510/191, 199, 363, 488; 134/42

[56] References Cited

U.S. PATENT DOCUMENTS

| | | | |
|---|---|---|---|
| 3,003,899 | 10/1961 | Eberhard et al. | 134/22.12 |
| 3,876,551 | 4/1975 | Laufer et al. | 252/187.25 |
| 3,890,228 | 6/1975 | Hwa et al. | 210/699 |
| 3,928,249 | 12/1975 | Nunziala | 252/526 |
| 3,959,167 | 5/1976 | Hwa et al. | 252/180 |
| 3,993,575 | 11/1976 | Howanitz et al. | 510/434 |
| 4,113,645 | 9/1978 | DeSimone | 252/186.44 |
| 4,174,290 | 11/1979 | Leveskis | 134/41 |
| 4,390,448 | 6/1983 | Boden et al. | 252/187.26 |
| 4,522,738 | 6/1985 | Magid et al. | 252/90 |
| 4,747,975 | 5/1988 | Ritter | 252/87 |
| 4,800,036 | 1/1989 | Rose et al. | 252/102 |
| 4,842,771 | 6/1989 | Rörig et al. | 510/181 |
| 4,853,146 | 8/1989 | Rorig et al. | 252/142 |
| 4,877,459 | 10/1989 | Cockrell, Jr. et al. | 134/4 C |
| 4,891,150 | 1/1990 | Gross et al. | 252/142 |
| 4,946,619 | 8/1990 | Fisher | 252/187.24 |
| 5,007,030 | 4/1991 | Cook et al. | 430/98 |
| 5,041,239 | 8/1991 | Rorig et al. | 252/315.1 |
| 5,055,219 | 10/1991 | Smith | 252/102 |
| 5,061,393 | 10/1991 | Linares et al. | 510/424 |
| 5,078,896 | 1/1992 | Rorig et al. | 252/102 |
| 5,192,460 | 3/1993 | Thomas | 252/142 |
| 5,294,363 | 3/1994 | Schwartz | 252/108 |
| 5,389,157 | 2/1995 | Smith | 134/22.13 |

FOREIGN PATENT DOCUMENTS

| | | | |
|---|---|---|---|
| 0130786A3 | 1/1985 | European Pat. Off. | |
| 0233110 | 8/1987 | European Pat. Off. | |
| 0253676A2 | 1/1988 | European Pat. Off. | |
| 0226551 | 8/1985 | German Dem. Rep. | |
| 61-207500 | 9/1986 | Japan. | |
| 4-331300 | 11/1992 | Japan. | |
| 1019869 | 2/1966 | United Kingdom. | |
| 2106927 | 4/1983 | United Kingdom. | |
| 9219549 | 11/1992 | WIPO. | |
| 9219557 | 11/1992 | WIPO. | |
| WO93/14181 | 7/1993 | WIPO | C11D 1/68 |

*Primary Examiner*—Paul Lieberman
*Assistant Examiner*—Kery A. Fries
*Attorney, Agent, or Firm*—Majestic, Parsons, Siebert & Hsue

[57] ABSTRACT

A thickened, buffered aqueous acidic cleaning composition suitable for removing mineral deposits is provided. In one embodiment, the composition comprises a weak acid and its conjugate base wherein the weak acid has a $pK_a$ of approximately 2 to 3.5 and where the composition has a pH of approximately 2 to 3.5. Organic acids, such as citric acid, are particularly suited. The addition of a thickening system comprising cetyl trimethyl ammonium chloride and sodium xylene sulfonate or alkyl diphenylether sulfonate produces a viscoelastic composition in which the viscosity can be controlled by the level and/or ratio of the surfactant/counterion. Suitable stable adjuncts including fragrances, dyes, organic solvents, disinfectants, and bleaches can be added to the composition.

26 Claims, 3 Drawing Sheets

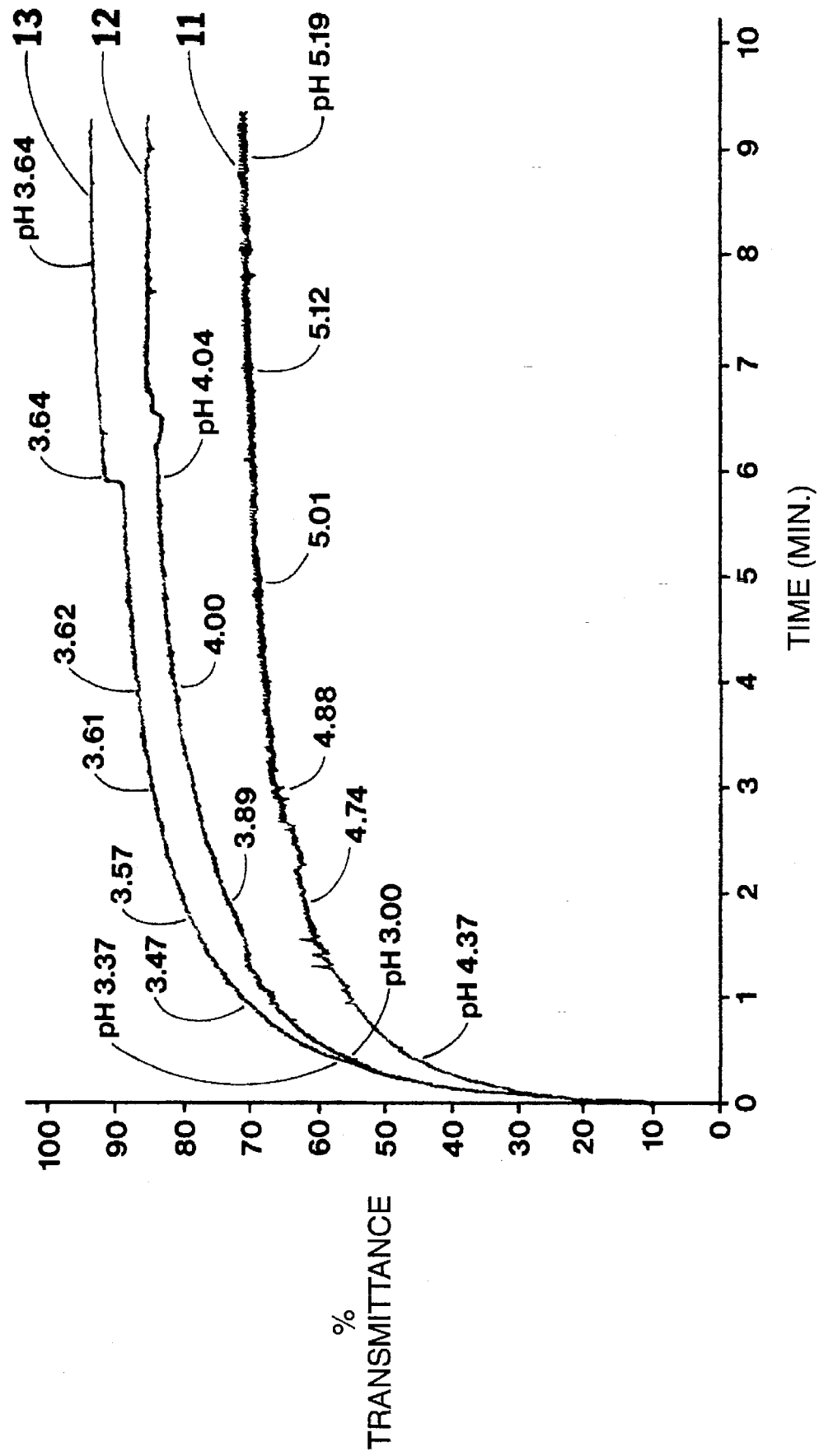
FIG._1

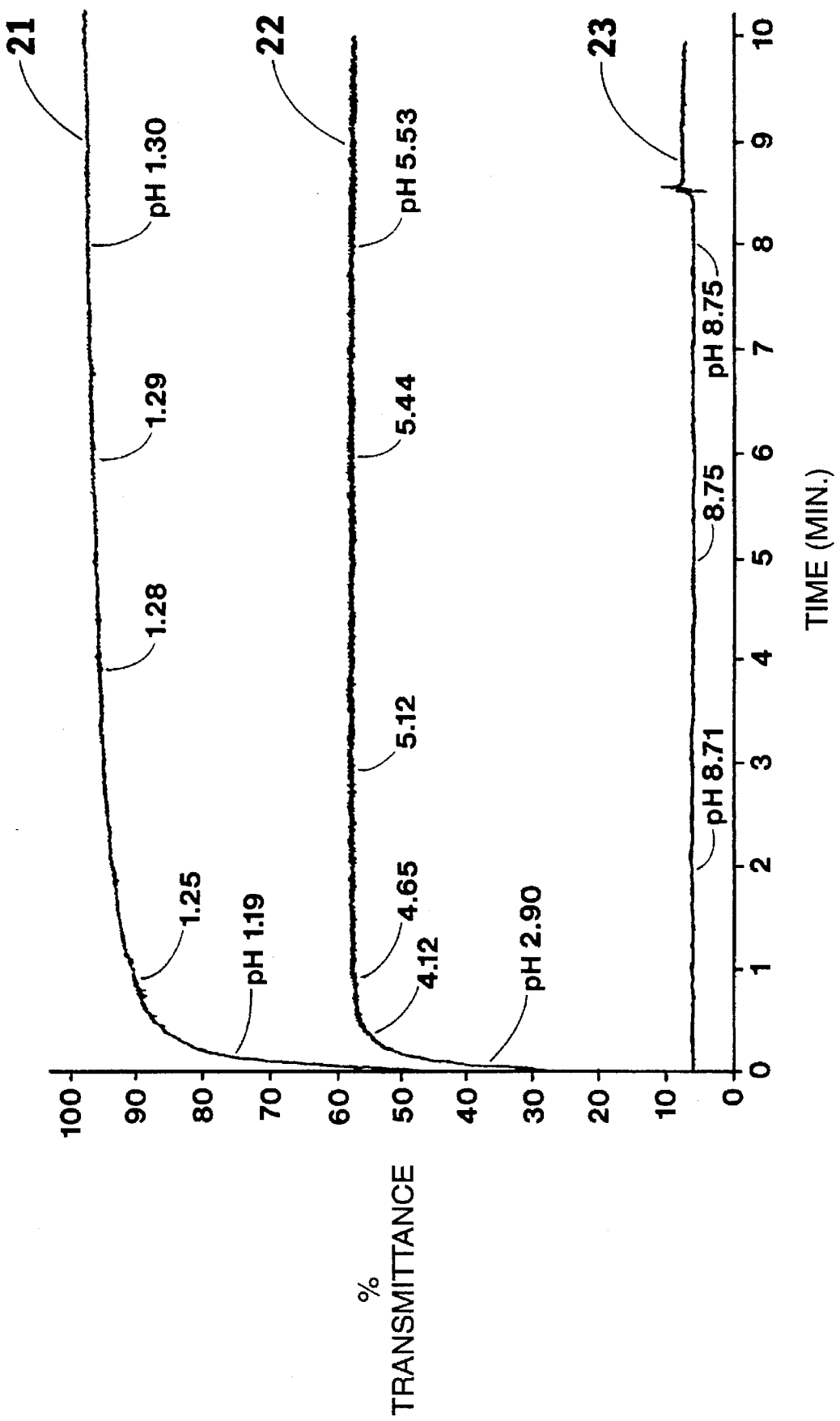
FIG._2

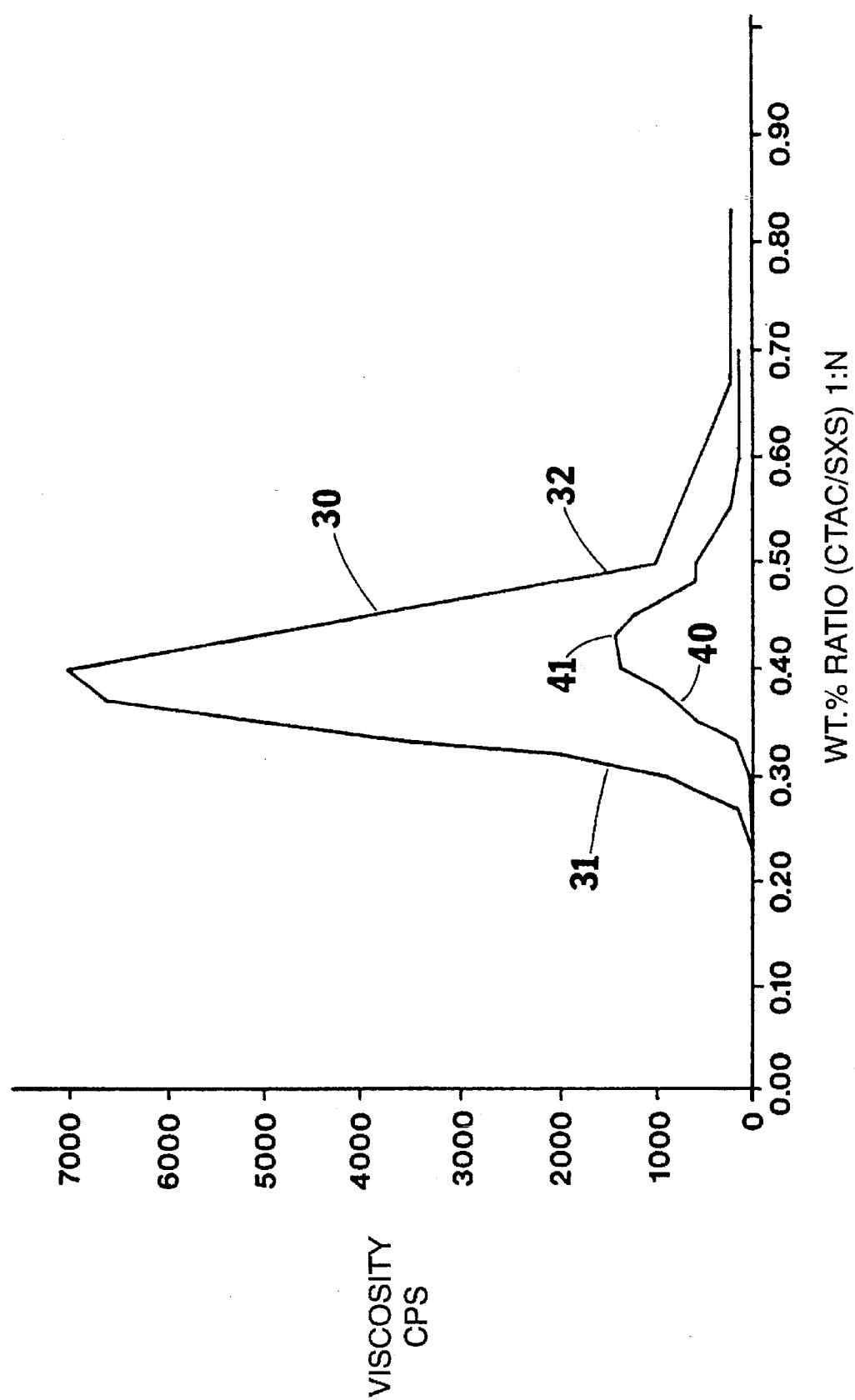
FIG._3

ACIDIC AQUEOUS CLEANING COMPOSITIONS

This is a continuation of application Ser. No. 08/004,091, filed Jan. 13, 1993 now abandoned.

FIELD OF THE INVENTION

The present invention relates generally to acidic liquid cleaners, and more particularly to buffered acidic cleaning compositions useful for removing mineral deposits from surfaces. The buffered acid cleaning compositions can include stable fragrances and dyes; moreover, the addition of suitable thickening agents allows the compositions to be readily applied to non-horizontal surfaces from conventional dispensers.

BACKGROUND OF THE INVENTION

The use of thickened and acidic liquid cleaning compositions for removing mineral deposits from surfaces is known. See, Gross et al., U.S. Pat. No. 4,891,150, issued Jan. 2, 1990, and Leveskis, U.S. Pat. No. 4,174,290, issued Nov. 13, 1979. A liquid cleaner is normally dispensed from bottles directly onto a stained surface to which the cleaner clings while the active ingredients remove some of the mineral deposits. However, prior art thickened acidic cleaners are deficient in a number of respects. First, the strength of current acidic liquid cleaners is substantially reduced upon dilution. Second, the low pH of acidic cleaners results in poor fragrance and dye stability and poses potential health and safety risks to consumers. Third, the low pH can degrade ingredients in the cleaning formulation as well as the packaging, e.g., plastic bottles and trigger mechanisms, in which in the cleaners are stored. Fourth, the thickener system of the art can produce viscous products that are difficult to apply from conventional nozzle dispensers.

SUMMARY OF THE INVENTION

It is an object of the present invention to produce a cleaner with relatively high acid activity while retaining a moderately acidic pH.

It is another object of the present invention to provide a buffered acidic liquid cleaner for removing mineral deposits from hard surfaces wherein the acidic cleaner remains effective even upon dilution.

It is still another object of the present invention to provide a buffered acidic cleaning composition that contains stable fragrances and dyes.

It is a further object of the present invention to provide a thickener system particularly suited for use with acidic liquid compositions to produce a viscoelastic composition that can be readily applied into crevices and non-horizontal surfaces from a dispenser.

These and other objects are achieved with the present invention which is based in part on the discovery that a buffered acid formulation containing a weak acid and having a formulation pH from approximately 2 to 3.5 demonstrates improved hard water deposit removal relative to conventional unbuffered mineral acid formulations at the same pH levels. The buffer is achieved by combining the acid with its conjugate base, or by forming the conjugate base by neutralizing excess acid. The combined acid and conjugate base weight concentration is preferably about 3% to 10% of the formulation and the molar concentration ratio of acid to conjugate base is preferably between approximately 1:30 to 30:1. The preferred acids include organic acids having $pK_a$ of approximately 2 to 3.5. A preferred organic acid is citric acid. The inventive buffered acid cleaner can also accommodate fragrances and dyeing agents which would be unstable in prior art formulations having lower pHs.

Another feature of the present invention is a thickener system comprising a cationic surfactant and a counterion. At the buffered acid pH range, the thickener produces a viscous formulation that has sufficient viscosity to adhere to non-horizontal surfaces and can be readily applied directly from nozzle dispensers. A preferred thickener system includes cetyl trimethyl ammonium chloride and an aromatic sulfonate or carboxylate counterion.

A preferred embodiment of the inventive buffered, thickened acidic liquid cleaner comprises, by weight percent, (1) citric acid and sodium citrate (for a combined total of 3–10%), (2) cetyl trimethyl ammonium chloride (1–6%), (3) sodium xylene sulfonate (0.2–5%), (4) fragrance agents (0.05–1.0%), (5) dye agents (<0.2%), (6) solvents (0–10%), and (7) the balance water. In this embodiment, approximately 0.5% to 4% sodium citrate is mixed with citric acid to achieve a final formulation pH of about 2.6. Alternatively, sodium hydroxide can be added to a solution containing 3% to 10% citric acid to adjust the pH to about 2.6 by converting some of the citric acid to citrate salt.

BRIEF DESCRIPTION OF THE DRAWINGS

FIG. 1 is a graph illustrating the dissolution of $CaCO_3$ by various buffered citric acid solutions having pH 2.60.

FIG. 2 is a graph illustrating the dissolution of $CaCO_3$ by HCl solutions having different pH levels.

FIG. 3 is a graph of viscosity profiles showing the effect of CTAC/SXS ratio on viscosity at varying CTAC concentrations.

DETAILED DESCRIPTION OF THE INVENTION

In accordance with the present invention, it has been discovered that buffered aqueous acidic compositions comprising a weak acid and its conjugate base demonstrate significantly improved hard water removal over unbuffered or mineral acid formulations at comparable pH levels. The buffered composition is particularly suited for removing hard water stains which are surface deposits of poorly soluble salts, such as calcium carbonate, calcium sulfate, magnesium carbonate, magnesium hydroxide, and ferrous or ferric hydroxides and carbonates.

The buffer is achieved by combining a weak acid with its conjugate base, or by the formation of the conjugate base by neutralizing some excess acid with caustic so that appreciable amounts of both the weak acid and its salt are present. A requirement for forming an effective buffer is that the weak acid employed has a $pK_a$ that is close to the formulation pH; preferably, the formulation pH should be within about ±1.5 pH unit of the acid's $pK_a$. The molar concentration ratio of acid to conjugate base is preferably between 1:30 to 30:1, more preferably between 1:10 to 30:1, and most preferably between 1:5 to 20:1. Furthermore, the formulation pH should preferably be lower than the acid $pK_a$ to insure that the acid concentration is higher than the acid anion concentration so as to maximize the acid capacity of the formulation. For the present invention, the conjugate base concentration should preferably be at least 5% of the total acid and conjugate base concentration.

Buffer capacity can also be expressed as the ratio of acid concentration to conjugate base (anion) concentration expressed as molar concentrations as defined by the Henderson-Hasselbalch equation:

$$pH = pK_a + \log \frac{[anion]}{[acid]}$$

where $K_a$ is the ionization constant for the acid and where $pK_a$ is defined as the -log of the $K_a$. As is apparent, the pH of the buffered formulation depends on the $K_a$ and the ratio of the concentration of the acid and anion.

It is believed that the basis for the sustained performance of the inventive cleaning composition is that as hard water deposits are dissolved by hydrogen ions, the buffer equilibrium maintains the level of hydrogen ions so that additional deposits are dissolved. The buffered formulation has a higher capacity for dissolving hard water stains compared to formulations in which acid is added simply to lower the pH. It is anticipated that with the buffered cleaners of the present invention, the rate of mineral deposit removal is proportional to the hydrogen ion concentration; however, as will be discussed further herein, many fragrances and dyeing agents are not stable in solutions having pHs of less than 2. For these reasons, the pH of the buffered cleaner is preferably from approximately 2 to 3.5, more preferably from approximately 2.5 to 3.

A variety of weak acids can be used in these cleaning formulations provided that the acid has a $pK_a$ value that is close to the formulation pH. Organic acids are most preferred. Citric acid is particularly noteworthy as it has a $pK_{a1}=3.06$, is readily available, and has low toxicity. Other suitable organic acids include, but are not limited to, mono and di-carboxylic acids such malonic acid, malic acid, and tartaric acid and mixtures thereof.

Buffered citric acid formulations of the present invention were tested with respect to their ability to dissolve $CaCO_3$ and compared to similar dissolution data based on HCl formulations. In this experiment, a 50 ml aliquot of buffered citric acid formulation at pH 2.60 was added to a solution containing 200 ppm 3/1 Ca/Mg hardness and 1.0 g $CaCO_3$. The final volume was 1 liter. A Brinkman colorimeter with a 4 cm dip probe calibrated at 100% with DI $H_2O$ was positioned in the solution. Thereafter, the transmittance was measured over time. Three different 50 ml aliquot buffered formulations having different combined concentrations of citric acid and citrate were tested. The combined concentrations were: 1 g/l, 3 g/l, and 5 g/l. FIG. 1 is a graph of the data (percent transmittance versus time) for each concentration. Curves 11, 12, and 13 show the transmittance profiles for the 1 g/l, 3 g/l, and 5 g/l combined citric acid and citrate samples, respectively. In addition, the fluctuation of the pH of the 1 liter solution is also indicated.

Similarly, for dissolution by a mineral acid formulation, a 50 ml aliquot of HCl was added to solution containing 200 ppm 3/1 Ca/Mg water hardness and 1.0 g $CaCO_3$. The final volume was 1.0 liter. Three different 50 ml samples at three different pH levels were tested, namely: 0.0, 1.0, and 3.0. The Brinkman colorimeter with the 4 cm dip probe with DI $H_2O$ calibrated at 100% transmittance was in place in the solution. FIG. 2 is a graph of the data (percent transmittance versus time) where curves 21, 22, and 23 represent the transmittance profiles for the pH 0.0, 1.0, and 3.0 HCl samples, respectively. The fluctuation of the pH is also indicated.

The turbidity profiles of FIGS. 1 and 2 show the rate and amount of $CaCO_3$ dissolved by acid. (If all the $CaCO_3$ was dissolved, the percent transmittance would equal 100%.) FIG. 1 illustrates that, with respect to buffered citric acid solutions that are at the same pH, the solution having the highest citric acid concentration achieves the best results. FIG. 2 shows that, for unbuffered mineral acid solutions, the lower the pH, the better the $CaCO_3$ dissolution. Indeed, at pH 0.0, better than 90% transmittance was achieved. As is apparent, the level of $CaCO_3$ dissolution by the citric acid/citrate at a concentration of 5 g/l buffered at pH 2.6 approaches that of the HCl formulation at pH 0.0.

Aside from the improved mineral deposit removal ability of the buffered acid cleaning solution, another important aspect of the present invention is that the pH levels of the inventive formulations can accommodate fragrances/dyes/thickeners which are not stable in lower pH conditions. The inventive formulation affords greater selectivity in terms of the aesthetic additives that can be used.

With respect to fragrances, these can be selected (and added in amounts) in accordance with aesthetic preferences, the only requirement is that they be stable at the formulation pH. Fragrances are usually blends of volatile oils that are composed of organic compounds such as esters, aldehydes, ketones or mixtures thereof. Such fragrances are usually proprietary materials commercially available from such manufacturers as Quest, International Flavors and Fragrances, Givaudan, and Firmenich, Inc. Examples of fragrances which may be suitable for use in the present invention may be found in Laufer et. al., U.S. Pat. No. 3,876,551, and Boden et. al., U.S. Pat. No. 4,390,448, issued Jun. 28, 1983, both of which are incorporated herein. Many of the above referenced functional groups undergo adverse chemical reactions at pH of less than about 2. This results in a change in the fragrance character or intensity which makes the fragrance unstable. The inventive buffered composition allows for stable fragrances. When employing pH sensitive fragrances, dyes, or thickeners, such adjuncts should be added after the buffered composition has been formulated at the relatively high pH.

Optionally, the composition may include surfactants, either for supplemental thickening or for non-thickening purposes, such as detergency, improving phase stability, wetting, and dispersing insoluble components. Such surfactants may be nonionic, anionic, cationic, or amphoteric species. Preferably, any such surfactants are selected to be compatible with the other components of the composition and stable at the composition pH range.

Cationic Surfactant/Counterion Thickening System

Thickeners are often added to liquid cleaners to increase the residence time the product adheres to surfaces. With the present buffered acid liquid cleaner, suitable thickeners include conventional thickeners such as xanthan gum, polymers, alkyl amines, and surfactant based thickeners. Other suitable thickeners include nonionic and amine oxide surfactants that offer a high degree of formula flexibility and compatibility with other components such as quaternary compounds.

For most household applications, thickened liquid cleaners should have a viscosity range of approximately 20 to 2000 cP, preferably about 50 to 1000 cP, and most preferably about 200 to 800 cP. When the thickened cleaner is applied to a non-horizontal surface, the high viscosity allows the cleaner to adhere to the surface long enough for the acids to dissolve the mineral deposits. Preferably, the thickened liquid cleaner is dispensed from a squeezable bottle with a nozzle of sufficient size to project a stream of cleaner onto the surface. Most preferably, the dispenser nozzle is adapted so that an upward stream can be projected for easy application onto hard-to-reach surfaces such as the rim of a toilet bowl.

While conventional thickeners are adequate for many applications, they suffer from numerous drawbacks when used with household cleaning products. For instance, they may be difficult to disperse into the formulation or may produce compositions that are often difficult to fill into containers, e.g., bottles. In addition, they may render the cleaning product opaque thereby causing aesthetic disadvantages. Moreover, when applying a viscous liquid cleaner from a squeezable plastic bottle directly onto a hard-to-reach surface, it is often necessary to apply a considerable amount of force in order for the liquid to reach the intended surface.

It has been found that a thickener system, comprising a cationic surfactant, cetyl trimethyl ammonium chloride (CTAC) and a counterion such as sodium xylene sulfonate (SXS), or alkyl diphenylether sulfonates, is particularly suited for producing viscoelastic products that can be readily dispensed from a squeeze-type plastic bottle. See Smith, U.S. Pat. No. 5,055,219, which is incorporated herein. A suitable squeeze-type dispenser is described in U.S. patent application Ser. No. 29/000,336, filed Oct. 9, 1992, and owned by assignee herein, said application being incorporated herein. (Alkyl diphenylether sulfonates are generally available from Dow Chemical Company under the Dowfax trade name.) Moreover, the product viscosity can be controlled either by the level and/or ratio of the surfactant/counterion. The resulting composition exhibits viscoelastic properties, i.e., shear thinning behavior (high viscosities at low shear rates).

It has been found that employing the proper concentration ratio of CTAC to counterion, e.g., SXS, is important for producing a thickened matrix having certain dispensing (flow) characteristics. (Reference herein to the concentration of CTAC, SXS, or any other cationic surfactant or counterion shall be on a weight basis.) FIG. 3 illustrates the non-linear viscosity behavior of two aqueous solutions represented by curves 30 and 40 with each solution containing a fixed amount of CTAC but containing different amounts of SXS. The first composition (curve 30) has a 6% CTAC weight concentration whereas the second (curve 40) has a 4.0% CTAC weight concentration. For each composition, as the concentration of SXS increases, the viscosity of the solution first increases to a maximum level before decreasing. The peak viscosity occurs at a CTAC:SXS ratio of about 1:0.44. The peak viscosity ratio will vary slightly depending on the amount of CTAC and other formulation components present. When the thickening system is utilized with the buffered acidic cleaner, the increased viscosity occurs at a CTAC to SXS ratio range of approximately 1:0.25 to 1:0.6. Preferably the cleaner should be formulated at a CTAC to SXS ratio range of 1:0.3 to 1:0.5 and most preferably at a ratio of approximately 1:0.4. Formulations at the peak ratio maximize the thickening efficiency for a given CTAC concentration and are generally the most cost effective. As is apparent from FIG. 3, one can achieve the same viscosity (for a given CTAC concentration), by employing either of two counterion concentrations. For example, points 31 and 32 of curve 30 correspond to compositions that have the same viscosities, but the composition of position 31 has less SXS.

It has been found that with the inventive thickening system, the ease by which a thickened aqueous composition is projected through a nozzle dispenser depends not only on its viscosity, but also on the ratio of CTAC to counterion as well. For instance, position 41 marks the peak viscosity for the second composition which corresponds to the viscosity of the first composition at positions 31 and 32. It was found that the viscous composition of position 31 was easier to dispense through a nozzle of a plastic squeezable container than the composition corresponding to position 41.

Additionally, the composition at position 31 is easier to dispense than that at position 32. That is, less pressure was required to project a stream of the former composition through the nozzle of a plastic dispenser. This suggests that where ease of application is important, the relative amounts of CTAC and SXS employed to achieve a desired viscosity should be such that the ratio of CTAC to SXS is less than the peak ratio and less than 1:0.44. A preferred CTAC to SXS ratio range is 1:0.30 to 1:0.43. Normally, for cleaning compositions the amount (by weight) of the cationic surfactant (e.g. CTAC) is approximately 5% or less and preferably approximately 3% or less. The amount of counterion (e.g. SXS or alkyl diphenylether sulfonates) is approximately 2.5% or less.

When using alkyl diphenylether sulfonates instead of (or in addition to) SXS as the counterion, the chain length of the alkyl group is also important in obtaining the desired thickening properties with CTAC. An alkyl chain length of $C_{12}$ (Dowfax 2A1) yielded a cloudy precipitate, but $C_{10}$ (Dowfax 3B2) and $C_8$ (Dowfax XDS 8292.00) resulted in homogenous products. Generally, the alkyl group should have ten carbon atoms or less. The viscosity profiles for aqueous solutions that employ alkyl diphenylether sulfonate counterions show similar non-linear behavior as in the case of the SXS counterion. For instance, the peak viscosity ratio of CTAC/Dowfax 3B2 is about 1:0.39. The peak ratio will vary depending on the alkyl group of the diphenylether sulfonate, with the longer, and thus higher weight alkyls having higher peak ratios. When this thickening system is utilized with the buffered acidic cleaner, the thickening occurs at a CTAC to alkyl diphenylether sulfonates weight ratio range of approximately 1:0.36 to 1:0.50; a preferred ratio of CTAC to alkyl diphenylether sulfonates ranges from approximately 1:0.38 to 1:0.48. With viscous products containing the alkyl diphenylether sulfonates counterion, the finished product has a more pronounced viscoelastic behavior, and may have a lower extensional viscosity than a product with the SXS system. This translates to a product that requires significantly less pressure to force through a nozzle, and hence should be preferred by the consumer.

The counterion of thickening system can comprise a mixture of SXS and alkyl diphenylether sulfonates. When such a counterion mixture is used, the peak viscosity should occur at a CTAC to counterion ratio corresponding to approximately the weighted averages of the individual counterion systems.

Although a thickening system comprising CTAC is particularly suited for use with the buffered acidic cleaner, other cationic surfactants, including cetyl trimethyl ammonium bromide, can be employed. Similarly, for the counterion, other aromatic sulfonates and carboxylates, including salicylic acid or naphthalene sulfonate, can be employed.

Besides thickeners, other adjuncts such as organic solvents, dyes, disinfectants, and bleaches can be added to the inventive buffered acidic liquid cleaning composition.

A preferred embodiment of the inventive buffered, thickened acidic liquid cleaner comprises, by weight percent, (1) citric acid and sodium citrate (for a combined total of 3–10%), (2) cetyl trimethyl ammonium chloride (1–6%), (3) sodium xylene sulfonate (0.2–5%), (4) fragrance agents (0.05–1.0%), (5) dye agents (<0.2%), (6) solvents (0–10%), and (7) the balance water. In this embodiment, approximately 0.5% to 4% sodium citrate is mixed with citric acid to achieve a final formulation pH of about 2.6.

Other preferred embodiments of the buffered thickened cleaner have the following compositions:

EXAMPLE 1

| Component | Wt. Percent |
| --- | --- |
| Citric acid | 2.5–10% |
| Sodium Citrate dihydrate | 0.2–6% |
| CTAC | 2–8% |
| SXS | 0.5–6% |
| Fragrance | 0.1–1% |
| Dye | <0.1% |
| Water | qs 100% |

EXAMPLE 2

| Component | Wt. Percent |
| --- | --- |
| Citric acid | 5.5% |
| Sodium citrate dihydrate | 0.75% |
| CTAC | 2.80% |
| SXS | 1.24% |
| Fragrance | 0.3% |
| Dye | 0.001% |
| Water | qs 100% |

Final pH = 2.6; viscosity is about 370 cps
The weight ratio of acid to conjugate base is 7.3:1

EXAMPLE 3

| Component | Wt. Percent |
| --- | --- |
| Citric acid | 5.5% |
| Sodium citrate dihydrate | 0.75% |
| CTAC | 2.75% |
| Dowfax 3B2 | 1.08% |
| Fragrance | 0.3% |
| Dye | 0.002% |
| Water | qs 100% |

Final pH = 2.6; viscosity is about 550 cps
The weight ratio of acid to conjugate base is 7.3:1

The relative amounts of citric acid and sodium citrate will vary depending on the desired pH. Instead of adding sodium citrate to citric acid, the addition of NaOH to citric acid to generate citrate (and which adjusts the pH) is an alternative process for achieving the buffer. Alternatively, for Examples 2 and 3, the buffer can be achieved by mixing enough sodium hydroxide to an approximate 6% solution of citric acid to adjust the pH to 2.6. In this latter scenario, enough excess acid must be present so that upon conversion of the acid to the salt form, there are still appreciable quantities of acid available to dissolve mineral deposits. Both options yield the desired buffer effect.

It is to be understood that while the invention has been described above in conjunction with preferred specific embodiments, the description and examples are intended to illustrate and not to limit the scope of the invention, which is defined by the scope of the appended claims.

It is claimed:

1. A buffered aqueous acidic cleaning composition suitable for removing mineral deposits comprising:
 a weak acid and its conjugate base, wherein a combined acid and conjugate base weight concentration is about 3% to 10% of said composition, wherein a ratio of acid to conjugate base is between approximately 7.3:1 by weight concentration ratio and 30:1 by molar concentration ratio, wherein said weak acid has a $pK_a$ of approximately 2 to 3.5 and wherein said cleaning composition has a pH of approximately 2 to 3.5; and
 a thickener system including a cationic surfactant and a counterion.

2. The buffered aqueous acidic cleaning composition as defined in claim 1 wherein said weak acid comprises an organic acid.

3. The buffered aqueous acidic cleaning composition as defined in claim 2 wherein said weak acid comprises citric acid.

4. The buffered aqueous acidic cleaning composition as defined in claim 1 further comprising an adjunct that is stable in said cleaning composition, wherein the adjunct includes a fragrance, a dyeing agent, a an additional thickener which is different from the thickener system, a surfactant, a detergent, an organic solvent, a disinfectant, a bleach, or mixtures thereof.

5. The buffered aqueous acidic cleaning composition as defined in claim 1 wherein the cationic surfactant comprises acetyl trimethyl ammonium halide and the counterion is selected from the group consisting of sodium xylene sulfonate, alkyl diphenylether sulfonate wherein the alkyl chain has ten carbon atoms or less, or mixtures thereof, and wherein the weight ratio of cetyl trimethyl ammonium halide to counterion ranges from approximately 1:0.25 to 1:0.6.

6. The buffered aqueous acidic cleaning composition as defined in claim 5 wherein the cationic surfactant comprises cetyl trimethyl ammonium chloride.

7. The buffered aqueous acidic cleaning composition as defined in claim 6 wherein the counterion comprises sodium xylene sulfonate and wherein the ratio of cetyl trimethyl ammonium chloride to sodium xylene sulfonate ranges from approximately 1:0.3 to 1:0.5.

8. The buffered aqueous acidic cleaning composition as defined in claim 6 wherein the counterion comprises alkyl diphenylether sulfonate wherein the alkyl chain has ten carbon atoms or less, and wherein the ratio of cetyl trimethyl ammonium chloride to alkyl diphenylether sulfonate ranges from approximately 1:0.36 to 1:0.5.

9. A method of removing mineral deposits from surfaces comprising the step of:
 applying a buffered aqueous acidic cleaning composition suitable for removing mineral deposits comprising a weak acid and its conjugate base, wherein a combined acid and conjugate base weight concentration is about 3% to 10% of said composition, wherein a ratio of acid to conjugate base is between approximately 7.3:1 by weight concentration ratio and 30:1 by molar concentration ratio, wherein said weak acid has a $pK_a$ of approximately 2 to 3.5 and wherein said cleaning composition has a pH of approximately 2 to 3.5, and a thickener system including a cationic surfactant and a counterion.

10. The method of removing mineral deposits from surfaces as defined in claim 9 wherein said weak acid comprises an organic acid.

11. The method of removing mineral deposits from surfaces as defined in claim 9 wherein the cationic surfactant comprises acetyl trimethyl ammonium halide and the counterion is selected from the group consisting of sodium xylene sulfonate, alkyl diphenylether sulfonate wherein the alkyl chain has ten carbon atoms or less, or mixtures thereof, and wherein the weight ratio of cetyl trimethyl ammonium halide to counterion ranges from approximately 1:0.25 to 1:0.6.

12. The method of removing mineral deposits from surfaces as defined in claim 11 wherein the cationic surfactant comprises cetyl trimethyl ammonium chloride, wherein the counterion comprises sodium xylene sulfonate, and wherein the ratio of cetyl trimethyl ammonium chloride to sodium xylene sulfonate ranges from approximately 1:0.3 to 1:0.5.

13. A buffered aqueous acidic cleaning composition suitable for removing mineral deposits, wherein the composition is formed by the process comprising:

mixing a weak acid with its conjugate base to form an aqueous solution, wherein a combined acid and conjugate base weight concentration is about 3% to 10% of said composition, wherein a ratio of acid to conjugate base is between approximately 7.3:1 by weight concentration ratio and 30:1 by molar concentration ratio, wherein said weak acid has a $pK_a$ of approximately 2 to 3.5 and wherein said cleaning composition has a pH of approximately 2 to 3.5: and adding a thickener system, including a cationic surfactant and a counterion, to said solution to form a viscous composition.

14. The buffered aqueous acidic cleaning composition as defined in claim 13 wherein said weak acid comprises an organic acid.

15. The buffered aqueous acidic cleaning composition as defined in claim 13 wherein the process further comprises adding an adjunct that is stable in said cleaning composition, wherein the adjunct includes a fragrance, a dyeing agent, a an additional thickener which is different from the thickener system, a surfactant, a detergent, an organic solvent, a disinfectant, a bleach, or mixtures thereof.

16. The buffered aqueous acidic cleaning composition as defined in claim 13, wherein the cationic surfactant comprises acetyl trimethyl ammonium halide and the counterion is selected from the group consisting of sodium xylene sulfonate, alkyl diphenylether sulfonate wherein the alkyl chain has ten carbon atoms or less, and mixtures thereof, and wherein the weight ratio of cetyl trimethyl ammonium halide to counterion ranges from approximately 1:0.25 to 1:0.6.

17. The buffered aqueous acidic cleaning composition as defined in claim 16 wherein the cationic surfactant comprises cetyl trimethyl ammonium chloride.

18. The buffered aqueous acidic cleaning composition as defined in claim 17 wherein the counterion comprises sodium xylene sulfonate and wherein the ratio of cetyl trimethyl ammonium chloride to sodium xylene sulfonate ranges from approximately 1:0.3 to 1:0.5.

19. The buffered aqueous acidic cleaning composition as defined in claim 17 wherein the counterion comprises alkyl diphenylether sulfonate wherein the alkyl chain has ten carbon atoms or less, and wherein the ratio of cetyl trimethyl ammonium chloride to alkyl diphenylether sulfonate ranges from approximately 1:0.36 to 1:0.5.

20. A buffered aqueous acidic cleaning composition suitable for removing mineral deposits, wherein the composition is formed by the process comprising the steps of:

forming a weak acid solution, wherein said weak acid has a $pK_a$ of approximately 2 to 3.5;

partially neutralizing the acid by adding enough base into said acid solution to form a buffered solution comprising the acid and its conjugate base wherein the buffered solution has a pH of approximately 2 to 3.5, wherein a combined acid and conjugate base weight concentration is about 3% to 10% of said buffered solution, and wherein a ratio of acid to conjugate base is between approximately 7.3:1 by weight concentration ratio and 30:1 by molar concentration ratio; and adding a thickener system, including a cationic surfactant and a counterion, to said solution to form a viscous composition.

21. The buffered aqueous acidic cleaning composition as defined in claim 20 wherein said weak acid comprises an organic acid.

22. The buffered aqueous acidic cleaning composition as defined in claim 20 wherein the process further comprises adding an adjunct that is stable in said cleaning composition, wherein the adjunct includes a fragrance, a dyeing agent, a an additional thickener which is different from the thickener system, a surfactant, a detergent, an organic solvent, a disinfectant, a bleach, or mixtures thereof.

23. The buffered aqueous acidic cleaning composition as defined in claim 20 wherein the cationic surfactant comprises acetyl trimethyl ammonium halide and the counterion is selected from the group consisting of sodium xylene sulfonate, alkyl diphenylether sulfonate wherein the alkyl chain has ten carbon atoms or less, and mixtures thereof, and wherein the weight ratio of cetyl trimethyl ammonium halide to counterion ranges from approximately 1:0.25 to 1:0.6.

24. The buffered aqueous acidic cleaning composition as defined in claim 23 wherein the cationic surfactant comprises cetyl trimethyl ammonium chloride.

25. The buffered aqueous acidic cleaning composition as defined in claim 24 wherein the counterion comprises sodium xylene sulfonate and wherein the ratio of cetyl trimethyl ammonium chloride to sodium xylene sulfonate ranges from approximately 1:0.3 to 1:0.5.

26. The buffered aqueous acidic cleaning composition as defined in claim 24 wherein the counterion comprises alkyl diphenylether sulfonate wherein the alkyl chain has ten carbon atoms or less, and wherein the ratio of cetyl trimethyl ammonium chloride to alkyl diphenylether sulfonate ranges from approximately 1:0.36 to 1:0.5.

* * * * *